(12) United States Patent
Choe et al.

(10) Patent No.: US 10,891,747 B1
(45) Date of Patent: Jan. 12, 2021

(54) SENSOR CALIBRATION SYSTEM FOR AUTONOMOUS DRIVING VEHICLES

(71) Applicant: Baidu USA LLC, Sunnyvale, CA (US)

(72) Inventors: Tae Eun Choe, Sunnyvale, CA (US); Yuliang Guo, Sunnyvale, CA (US); Guang Chen, Sunnyvale, CA (US); Ka Wai Tsoi, Sunnyvale, CA (US); Weide Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/457,775

(22) Filed: Jun. 28, 2019

(51) Int. Cl.
   *G06T 7/536*   (2017.01)
   *G06T 7/80*    (2017.01)
   *G06K 9/00*    (2006.01)
   *G06T 7/55*    (2017.01)
   *G06T 11/00*   (2006.01)
   *G05D 1/02*    (2020.01)

(52) U.S. Cl.
   CPC .......... *G06T 7/536* (2017.01); *G05D 1/0231* (2013.01); *G05D 1/0257* (2013.01); *G06K 9/00798* (2013.01); *G06T 7/55* (2017.01); *G06T 7/80* (2017.01); *G06T 11/00* (2013.01); *G05D 2201/0213* (2013.01); *G06T 2207/10004* (2013.01); *G06T 2207/20081* (2013.01); *G06T 2207/30256* (2013.01)

(58) Field of Classification Search
   None
   See application file for complete search history.

(56) References Cited

U.S. PATENT DOCUMENTS

| | | | |
|---|---|---|---|
| 2007/0165909 A1* | 7/2007 | Leleve | G06T 7/80 382/104 |
| 2011/0102583 A1* | 5/2011 | Kinzalow | B60R 1/00 348/137 |
| 2014/0043473 A1* | 2/2014 | Gupta | H04N 17/002 348/135 |
| 2018/0093613 A1* | 4/2018 | Timoneda | H04N 7/181 |
| 2018/0131924 A1* | 5/2018 | Jung | G06K 9/00798 |

* cited by examiner

*Primary Examiner* — Kyle Zhai
(74) *Attorney, Agent, or Firm* — Womble Bond Dickinson (US) LLP

(57) ABSTRACT

In response to a first image captured by a camera of an ADV, a horizon line is determined based on the camera's hardware settings, representing a vanishing point based on an initial or default pitch angle of the camera. One or more lane lines are determined based on the first image via a perception process performed on the first image. In response to a first input signal received from an input device, a position of the horizon line is updated based on the first input signal and a position of at least one of the lane lines is updated based on the updated horizon line. The input signal may represent an incremental adjustment for adjusting the position of the horizon line. A first calibration factor or first correction value is determined for calibrating a pitch angle of the camera based on a difference between the initial horizon line and the updated horizon line.

20 Claims, 9 Drawing Sheets

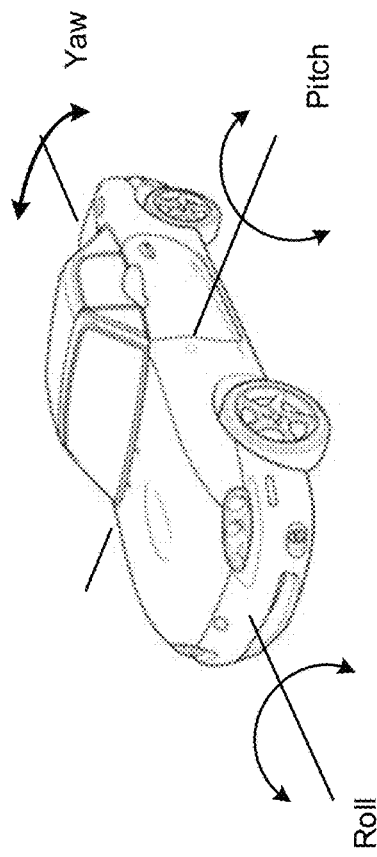
FIG. 5A
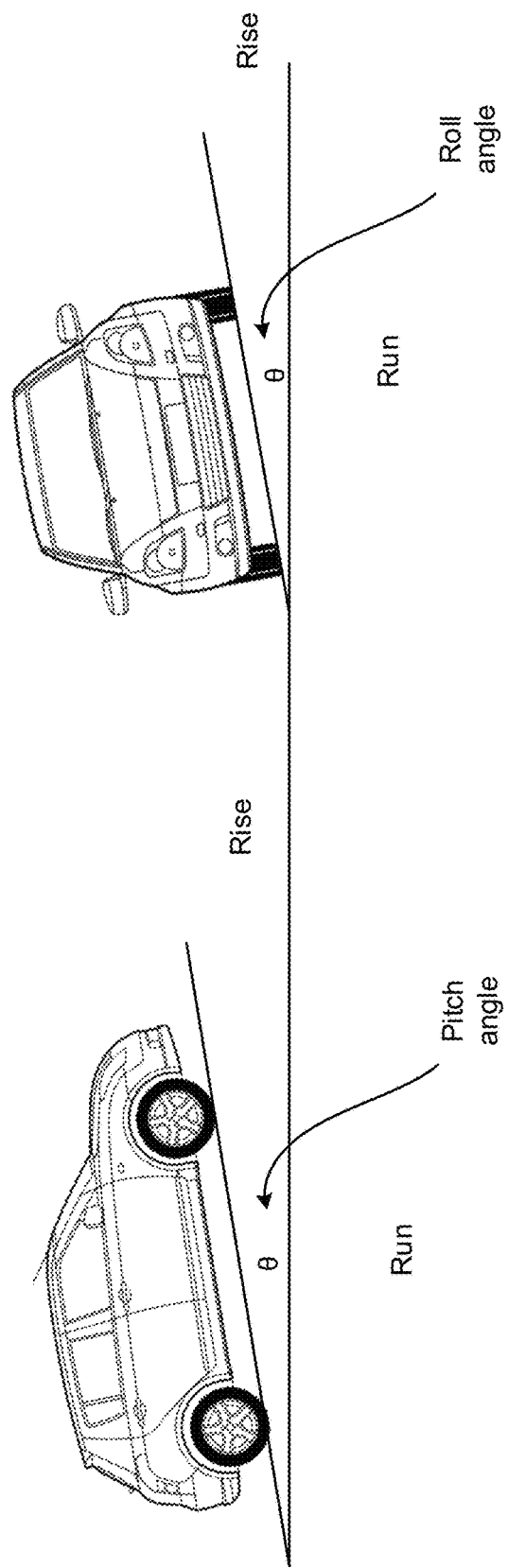
FIG. 5B
FIG. 5C

SENSOR CALIBRATION SYSTEM FOR AUTONOMOUS DRIVING VEHICLES

TECHNICAL FIELD

Embodiments of the present disclosure relate generally to operating autonomous vehicles. More particularly, embodiments of the disclosure relate to calibrating a sensor system of an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

In order to accurately autonomously drive the vehicle, the system relies heavily on the sensor data obtained from the sensors such as cameras, light detection and ranging (LIDAR), and radio detection and ranging (RADAR) devices, etc. that are mounted on the vehicle. However, such sensors require periodically calibrated to make sure the accuracy of the sensors, such that the perception system of an autonomous driving system can accurately detect and recognize the objects and lane configuration of the driving environment. However, there has been a lack of efficient sensor calibration system.

BRIEF DESCRIPTION OF THE DRAWINGS

Embodiments of the disclosure are illustrated by way of example and not limitation in the figures of the accompanying drawings in which like references indicate similar elements.

FIGS. 5A-5C show a pitch angle, a yaw angle, and a roll angle of a vehicle.

DETAILED DESCRIPTION

Figure 1:
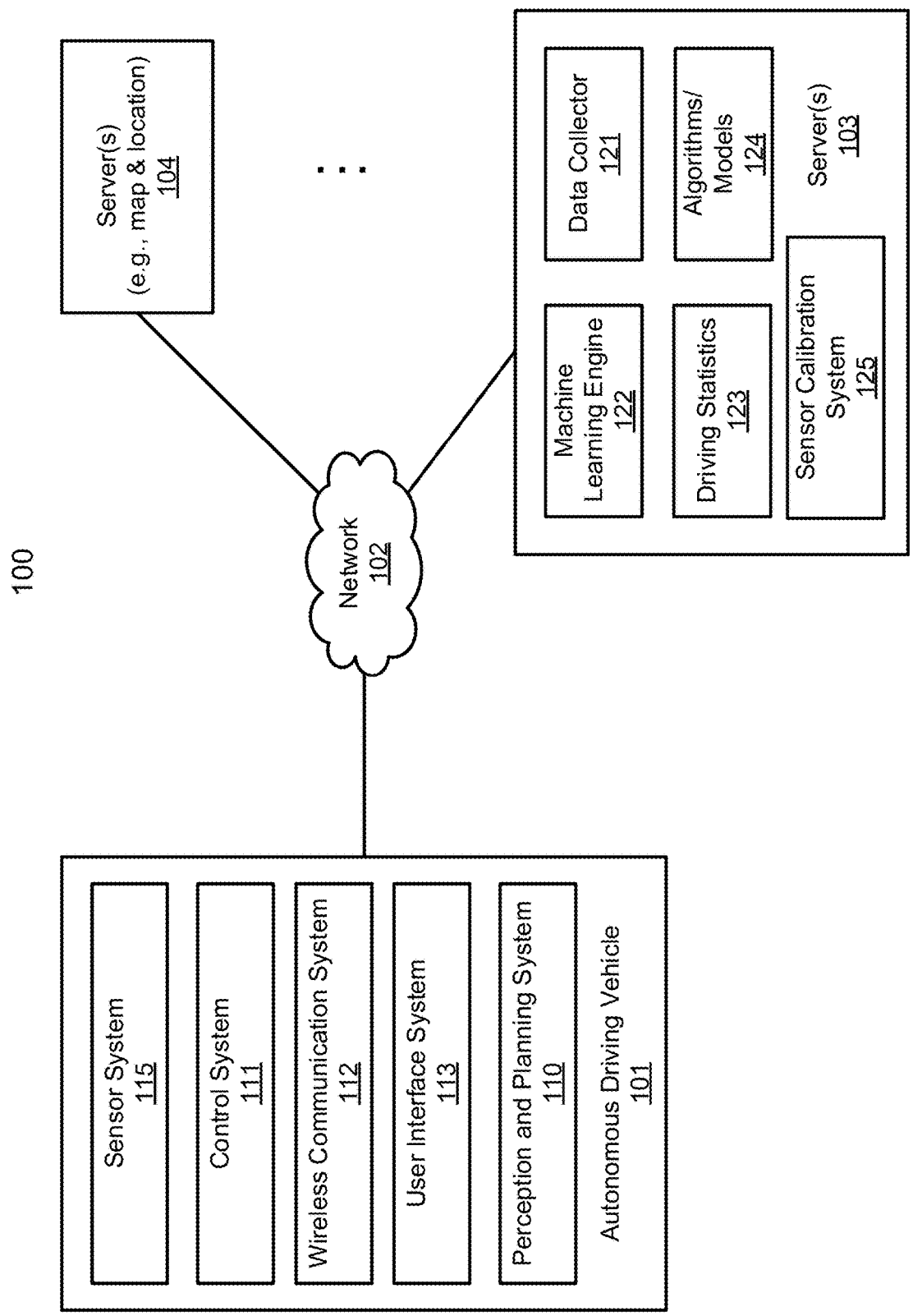
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a calibration system with a visualizer is utilized to calibrate sensors (e.g., cameras, LIDAR, RADAR) of an autonomous driving vehicle (ADV). The visualizer includes a user interface to visually display a two-dimensional (2D) image captured by a camera and a three-dimensional (3D) image to allow a user visually calibrate the camera, a LIDAR device, and/or a RADAR device. A user can calibrate any of the sensors such as a pitch angle, a yaw angle, and/or a roll angle using an input device such as a keyboard or joystick to provide incremental calibration feedback, while displaying the calibration result on a display device concurrently. As a result, the user can visually "feel" the calibration result based on user feedback.

According to one embodiment, in response to a first image captured by a camera of an ADV, a horizon line is determined based on the camera's hardware settings. The horizon line represents a vanishing point from a view point of the ADV based on an initial or default pitch angle of the camera. One or more lane lines are determined based on the first image via a perception process performed on the first image. In response to a first input signal (e.g., an up or down arrow key) received from an input device (e.g., keyboard, joystick, voice interactive command), a position of the horizon line is updated based on the first input signal and a position of at least one of the lane lines is updated based on the updated horizon line. The input signal may represent an incremental adjustment for adjusting the position of the horizon line. A first calibration factor or first correction value is determined for calibrating a pitch angle of the camera based on a difference between the initial horizon line and the updated horizon line.

In one embodiment, the first image with the horizon line superimposed thereon is displayed within a first display area of a display device. When the position of the horizon line is updated, the first image is updated on the first display area to update the position of the horizon line to give a visual feedback to a user. In one embodiment, a second image is displayed within a second display area of the display device. The second image includes the lane lines superimposed thereon from a top view or a 3D view based on the 2D view of the first image. When the horizon line is updated, the positions of the lane lines are also updated on the second image on the second display area based on the pitch angle represented by the updated horizon line. In one embodiment, a third image is generated based on the first image and the second image, also referred to as a re-projected 2D view of the first image based on the 3D information associated with the second image. The third image is displayed within a third display area of the display device. When the lane lines are adjusted based on the input signal on the second image, the lane lines displayed on the third image are also adjusted to reflect the updates of the lane lines in a 2D view. The user can view the result of the lane lines based on the updated pitch angle of the camera.

According to one embodiment, in response to a second input signal received from the input device (e.g., left or right arrow key), the position of at least one of the lane lines is modified based on the second input signal. The positions of the lane lines are updated on the second image displayed on the second display area. A second calibration factor for calibrating a yaw angle of the camera is determined based on the modification of the positions of the lane lines. Similarly, in response to a third signal received from the input device (e.g., shift-left or shift-right arrow key), the lane lines are modified and a third calibration factor for calibrating a roll angle of the camera is determined. The first, second, and third images are concurrently displayed within the first, second, and third display areas respectively. The processes similar to the above process can be implemented to determine calibration factors for LIDAR and/or RADAR devices. The above processes can be utilized online while the vehicle is driving and real-time images are captured to calibrate the sensors in real-time. Alternatively, the above processes can be performed offline based on the previously captured images or point clouds. The calibration factors can be utilized by software applications such as a perception module to adjust the image processing parameters such as pitch, yaw, and roll angles to compensate the hardware during the image processing.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
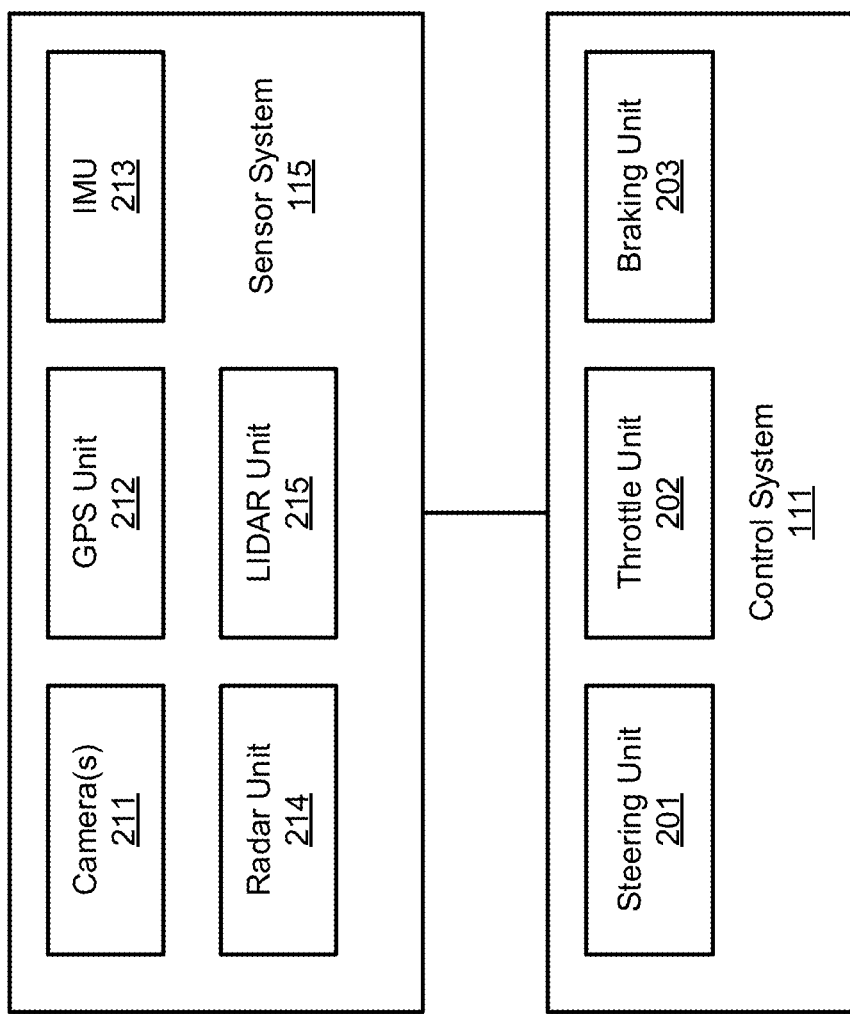
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle

101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms for autonomous driving a vehicle as described further below. Algorithms 124 may further include sensor calibration algorithms, which will be described further below. Algorithms 124 can then be uploaded on ADVs to be utilized during autonomous driving in real-time.

In one embodiment, sensor calibration system 125 may be hosted by server 103 to calibrate sensors such as cameras, LIDAR, and/or RADAR devices offline based on the images and/or point clouds captured by the sensors. The sensor calibration process may be performed offline based on the previously captured sensor data captured by the targeted sensors of ADVs. The calibration parameters can then be uploaded to the corresponding vehicles and utilized by autonomous driving software to calibrate and compensate the corresponding sensors. The calibration process will be described in details further below.

Figure 3A:
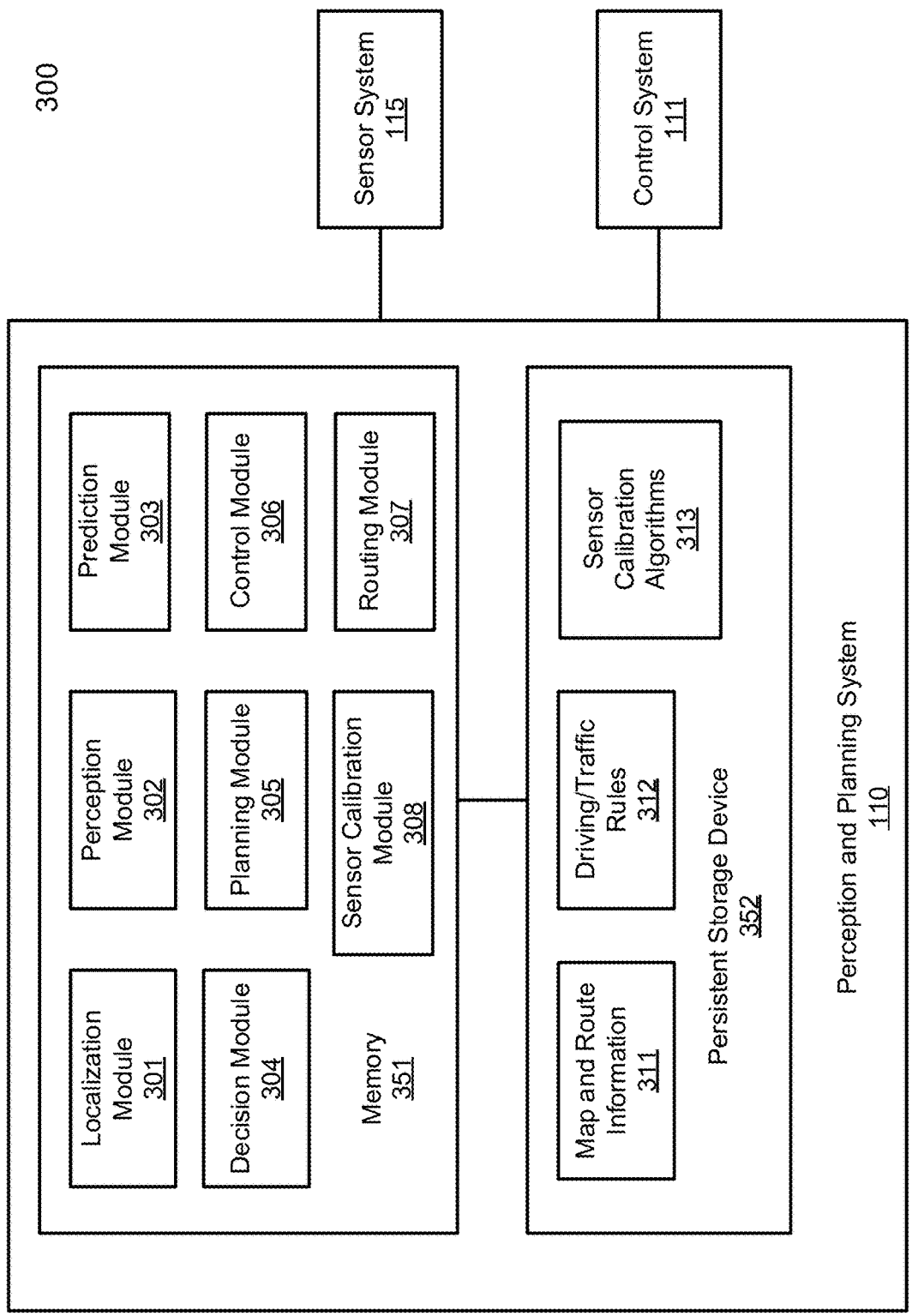
FIGS. 3A-3B are block diagrams illustrating an example of a perception and planning system used with an autonomous vehicle according to one embodiment.
Figure 3B:
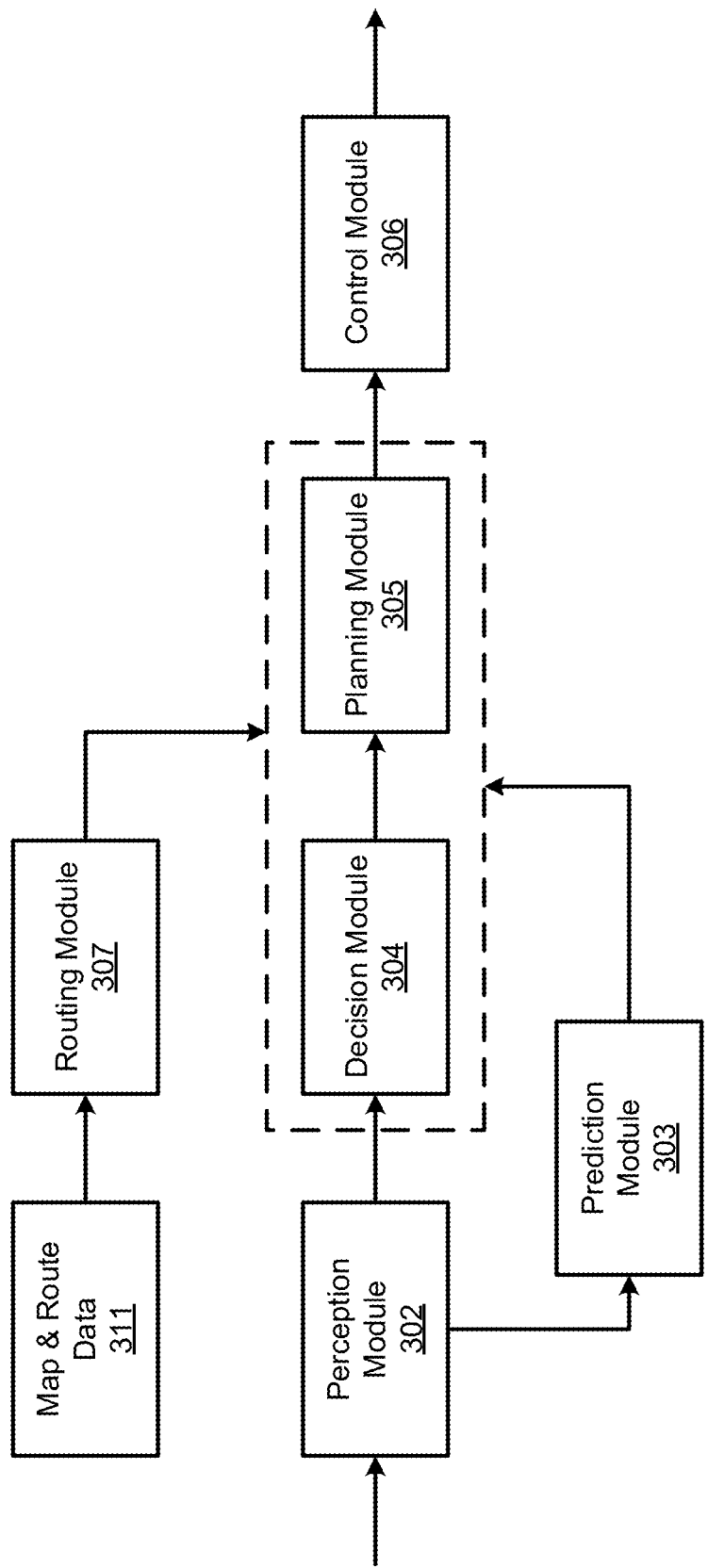

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and sensor calibration module or system 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, sensor calibration module or system 308 is configured to calibrate, using sensor calibration algorithms 313, a sensor based on an image or point cloud captured by the sensor to determine a set of calibration parameters. The calibration parameters can be utilized by the software to compensate the hardware settings of the sensors during a perception process. Sensor calibration module 308 may be implemented as a part of perception module 302 or communicatively coupled to perception module 302. The functionalities of sensor calibration module 308 may be maintained in a data analytics system such as server 103 to perform a sensor calibration of a sensor offline based on the images captured by the corresponding sensor. The calibration result can then be uploaded onto the vehicle to be utilized online during the image processing as a part of the perception process.

Figure 4:
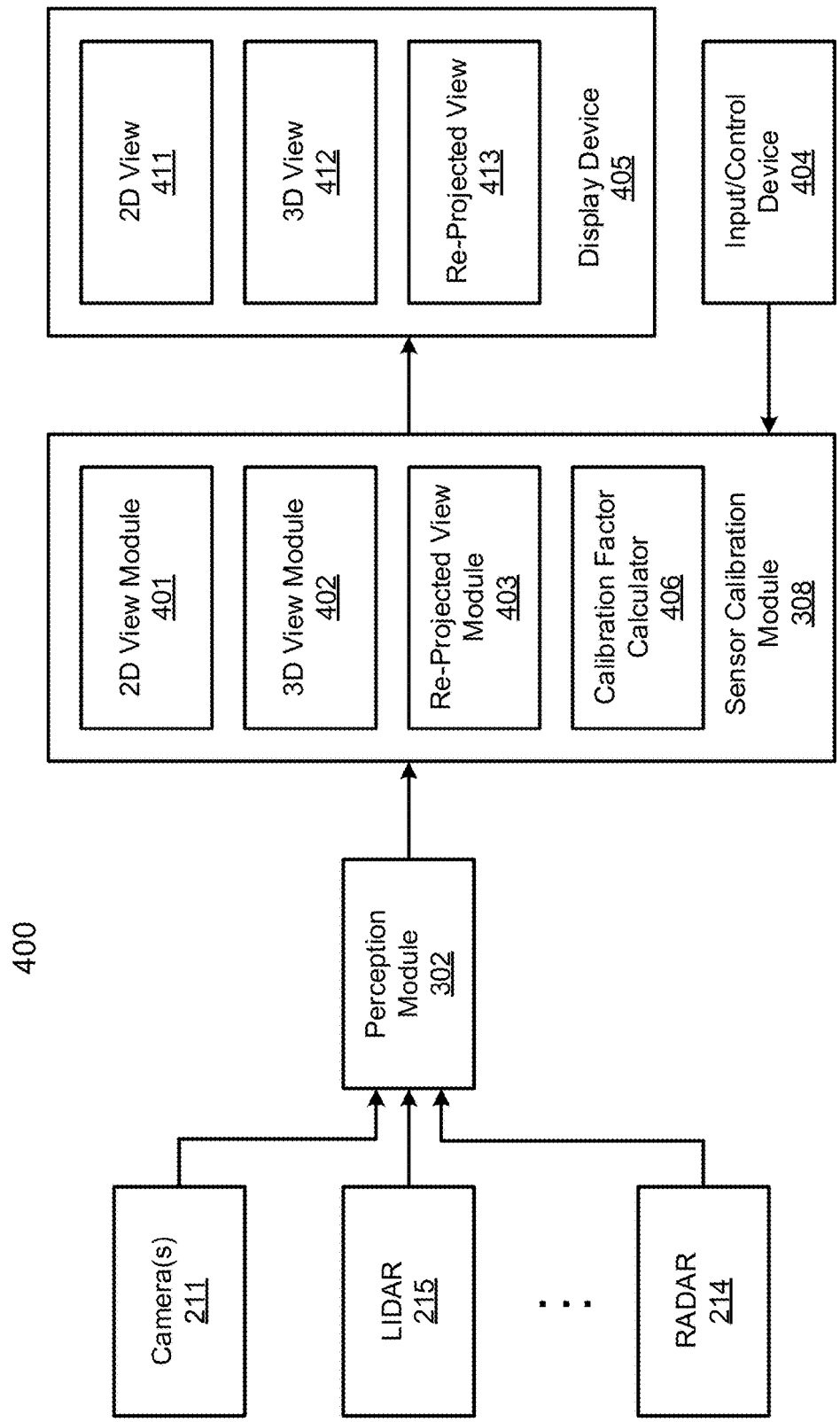
FIG. 4 is a block diagram illustrating a sensor calibration system according to one embodiment.

FIG. 4 is a block diagram illustrating a sensor calibration system according to one embodiment. Referring to FIG. 4, as described above, perception module 302 receives sensor data from a variety of sensors such as camera 211, LIDAR 215, and RADAR 214. For camera 211, sensor data may include an image and for LIDAR 215, the corresponding sensor data may include a point cloud image. The sensor data is then processed by perception module 302 such as image processing, including detecting an object within the image and determining a horizon line representing a vanishing point of a road. The result of the perception processing can be utilized by other modules such as prediction module 303 and planning module 305 for autonomous driving.

In addition, an image processed by perception module 302 may be utilized by sensor calibration module 308 for sensor calibration. According to one embodiment, sensor calibration module 308 includes a 2D rendering module 401, a 3D rendering module 402, and a 2D re-projecting module 403. In response to an image captured by camera 211 and processed by perception module 302, 2D rendering module 401 is configured to render a 2D view including superimposing a horizon line onto the image according to the camera setting (e.g., hardware preset pitch angle). The 2D view image is then displayed on display device 405 as part of 2D view 411. Based on the 2D view image, 3D rendering module 412 is configured to render a 3D view such as a top-down view using other 3D information such as sensor data obtained from LIDAR 215 and RADAR 214. The 3D view image is then displayed on display device 405 as part of 3D view 412. The 2D re-projecting module 403 is configured to render or reconstruct a 2D view from 3D view image. Note that the 2D re-projecting module 403 may be integrated with 2D rendering module 401.

The re-projected 2D view is then displayed on display device 405 as part of 2D re-projected view 413. A user can then enter feedback or adjustment using input device 404 such as a keyboard or joystick. In response to the input provided by the user, modules 411-413 adjust certain parameters, render the images again, and display the updated images on display device 405. As a result, the user can calibrate the sensors until the calibration results as shown on display device 405 are satisfied. Once the calibration results are satisfied, calibration factor calculator 406 determines the calibration factor 410 and feeds back to perception module 302 or other software modules such that the software modules can perform proper adjustment at the software level to compensate the hardware settings of the sensors.

According to one embodiment, in response to a first image captured by a camera of an ADV, perception module 302 determines a horizon line based on the camera's hardware settings. The horizon line represents a vanishing point from a view point of the ADV based on an initial or default pitch angle of the camera. Perception module 302 may include an object detector to detect an object within the image and a lane detector to detect one or more lanes. One or more lane lines are determined based on the first image by perception module 302. The processed first image having the detected objects, lane lines, and the horizon line is provided to sensor calibration module 308.

In response to a first input signal (e.g., an up or down arrow keypress) received from an input device (e.g., a keyboard, a joystick, a microphone to receive voice interactive commands), a position of the horizon line is updated based on the first input signal and a position of at least one of the lane lines is updated based on the updated horizon line. The input signal may represent an incremental value for adjusting the position of the horizon line. A first calibration factor or first correction value is determined for calibrating a pitch angle of the camera based on a difference between the initial horizon line and the updated horizon line. A pitch angle may be represented by a pitch slope angle or a pitch grade/slope percentage as shown in FIGS. 5A and 5B. A positive pitch angle represents an uphill road and a negative pitch angle represents a downhill road, or vice versa.

In one embodiment, the first image with the horizon line superimposed thereon is rendered by 2D module 401 and displayed within a first display area of display device 405 as part of 2D view 411. When the position of the horizon line is updated, the first image is rendered again in view of the input signal and updated on the first display area as part of 2D view 411 to update the position of the horizon line to give a visual feedback to a user. In one embodiment, a second image is rendered by 3D rendering module 402 and displayed within a second display area of display device 405 as part of 3D view 412. The second image includes the lane lines superimposed thereon from a top view or a 3D view corresponding to the 2D view of the first image. When the horizon line is updated, the positions of the lane lines are also updated on the second image (e.g., 3D view 412) on the second display area based on the pitch angle represented by the updated horizon line.

In one embodiment, an optional third image is generated by 2D re-projecting module 403 based on the first image 411 and the second image 412, also referred to as a re-projected 2D view of the first image based on the 3D information associated with the second image. The third image is displayed within a third display area of display device 405 as part of 2D re-projected view 413. When the lane lines are adjusted based on the input signal on the second image, the lane lines displayed on the third image are also adjusted to reflect the updates of the lane lines in a 2D view. The user can view the result of the lane lines based on the updated pitch angle of the camera.

According to one embodiment, in response to a second input signal received from the input device 404 (e.g., left or right arrow key), the position of at least one of the lane lines is modified based on the second input signal. The positions of the lane lines are updated on the second image 412 displayed on the second display area. A second calibration factor for calibrating a yaw angle of the camera is determined based on the modification of the positions of the lane lines. A yaw angle represents a horizontal turning left and right of an object.

Similarly, in response to a third signal received from the input device (e.g., shift-left or shift-right arrow key), the lane lines are modified and a third calibration factor for calibrating a roll angle of the camera is determined. A roll angle refers to whether an object is tilted or rolled left or right. The roll angle may be represented by a roll slope angle or a roll grade/slope percentage as shown in FIGS. 5A and 5C. A positive roll angle represents a road tilted left and a negative roll angle represents a road tilted right, or vice versa.

The first, second, and third images are concurrently displayed within the first, second, and third display areas respectively. The processes similar to the above process can be implemented to determine calibration factors for LIDAR and/or RADAR devices. The above processes can be utilized online while the vehicle is driving and real-time images are captured to calibrate the sensors in real-time. Alternatively, the above processes can be performed offline based on the previously captured images or point clouds. The calibration factors can be utilized by software applications such as a perception module to adjust the image processing parameters such as pitch, yaw, and roll angles to compensate the hardware during the image processing.

Figure 6A:
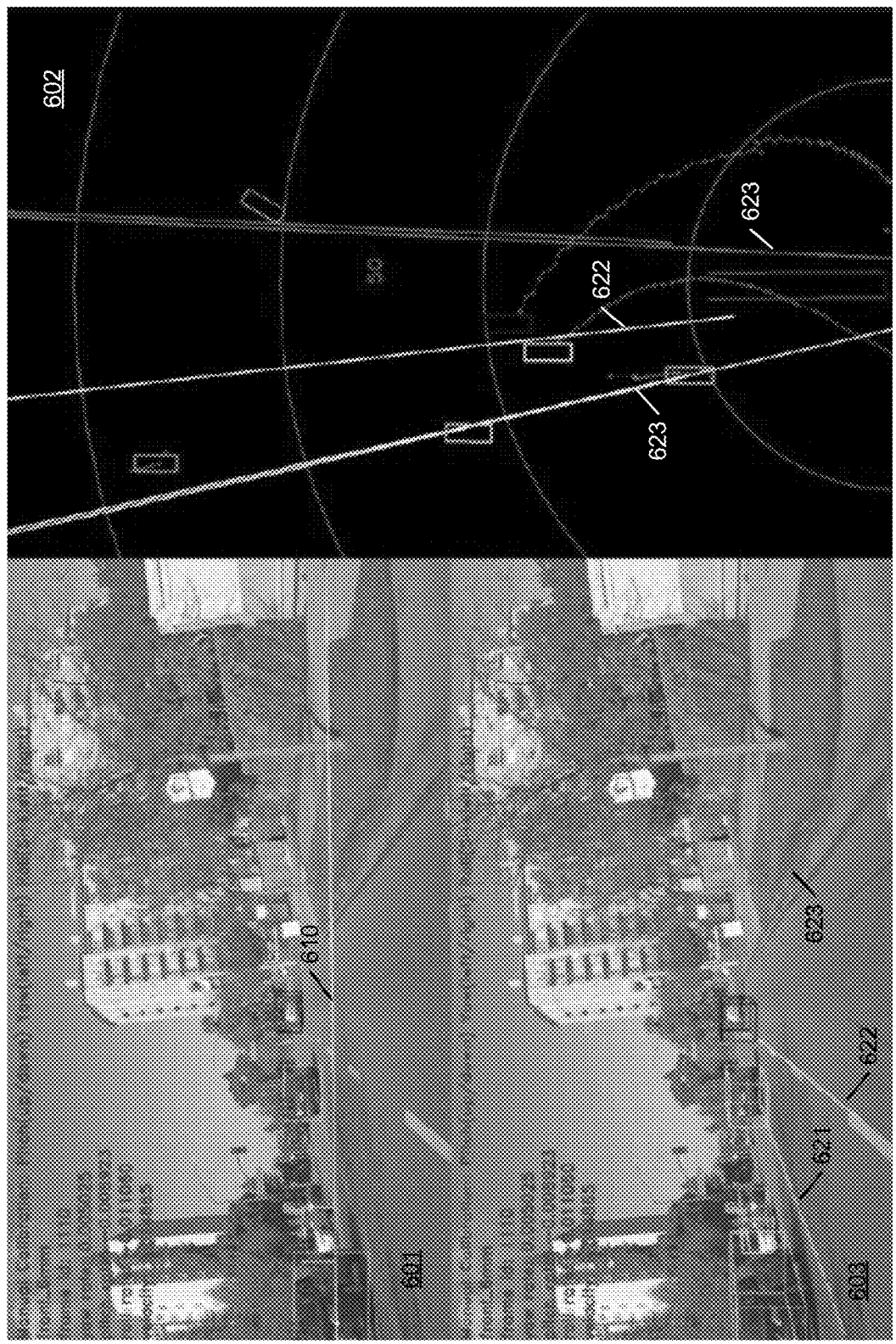
FIGS. 6A and 6B are screenshots illustrating an example of a graphical user interface for calibrating sensors according to one embodiment.
Figure 6B:
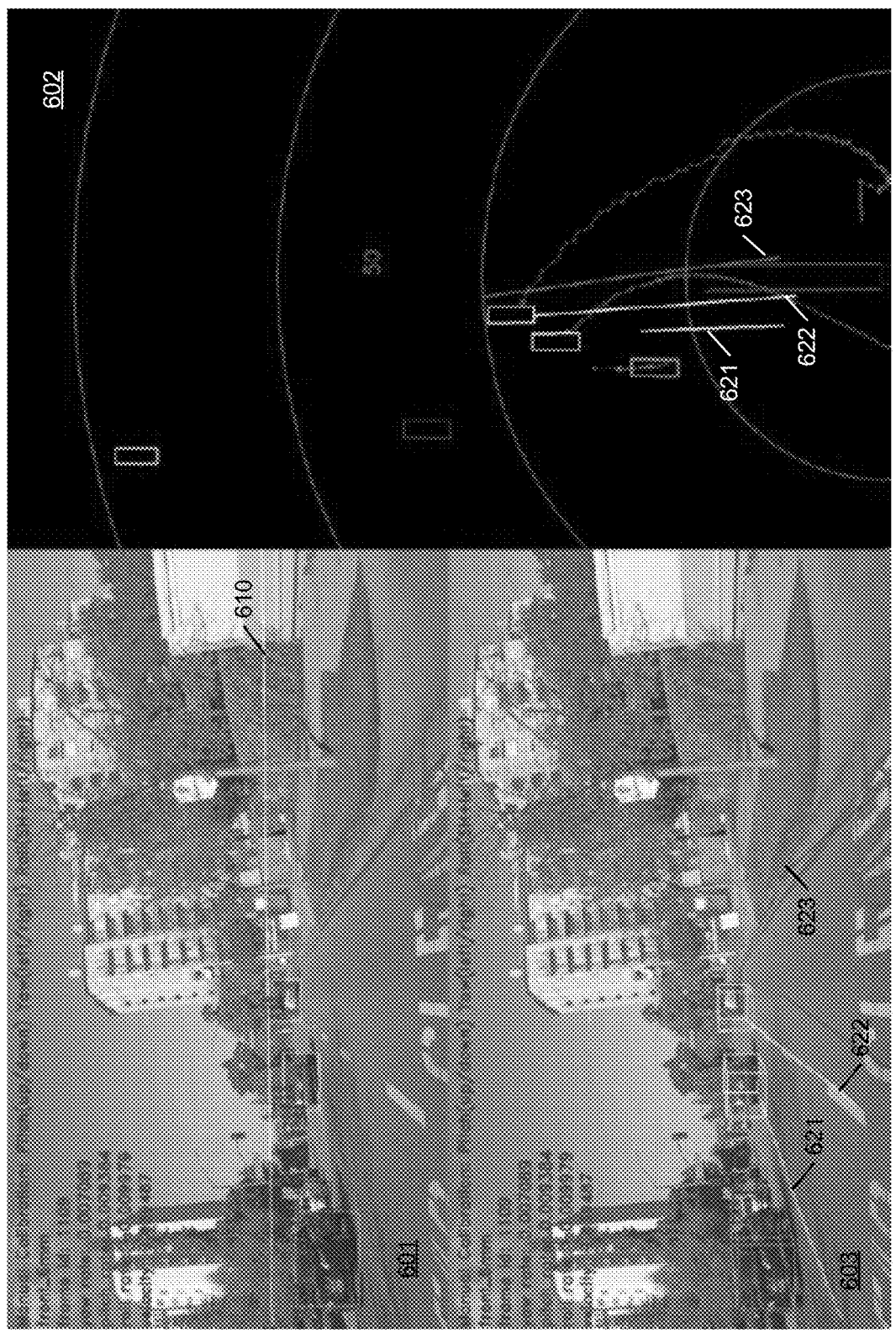

FIGS. 6A-6B are screenshots illustrating a graphical user interface of a sensor calibration system according to one embodiment. Referring to FIG. 6A, in this example, the system is calibrating a pitch angle of a camera. Image 601 was captured by a camera to be calibrated and processed by perception module 302, including detecting objects shown on the image indicated by the bounding boxes in this example. In addition, horizon line 610 is determined and placed on a location within image 601 based on the hardware setting of the targeted camera. Image 601 may be rendered by 2D rendering module 401 and displayed within a first display area of a display device as a 2D view.

Based on the image 601, image 602 representing a 3D view, in this example, a top-down view, is generated based on the image 601 and other 3D information, for example, provided by a LIDAR device and/or RADAR device. Image 602 may be rendered by 3D rendering module 402 and displayed within a second display area of the display device. Image 402 includes one or more lane lines 621-623 positioned based on the position of horizon line 610. In addition, optional image 603, referred to herein as a 2D re-projected view, is generated based on 2D view image 601 and 3D view image 602, including projecting lane lines 621-623 onto the 2D view.

From the top-down view, when a pitch angle of a camera has been calibrated, lane lines 621-623 should be relatively or substantially parallel. In this example, assuming horizon line 610 is too low, which causes lane lines to be diverged. Similarly, if the horizon line 610 is too high, as shown in FIG. 6B, lane lines 621-623 shown in 3D view 602 would be converged. By displaying the top-down view based on the position of horizon line 610, a user can calibrate the pitch angle by adjusting the position horizon line 610, for example, using an up-arrow key or a down-arrow key of a keyboard as an input device, until lane lines 621-623 are relatively parallel on the 3D view 602. An input device can also be a joystick or a microphone that can receive a voice interactive command from a user. Similarly, the yaw angle and the roll angle of a camera can also be calibrated using the techniques as described above.

LIDAR device and RADAR device can also be calibrated in a similar manner as described above. In one embodiment, in order to calibrate a LIDAR device or a RADAR device, a camera needs to be calibrated accurately first. Based on the images provided by the camera, a LIDAR device or a RADAR device can be calibrated.

Figure 7:
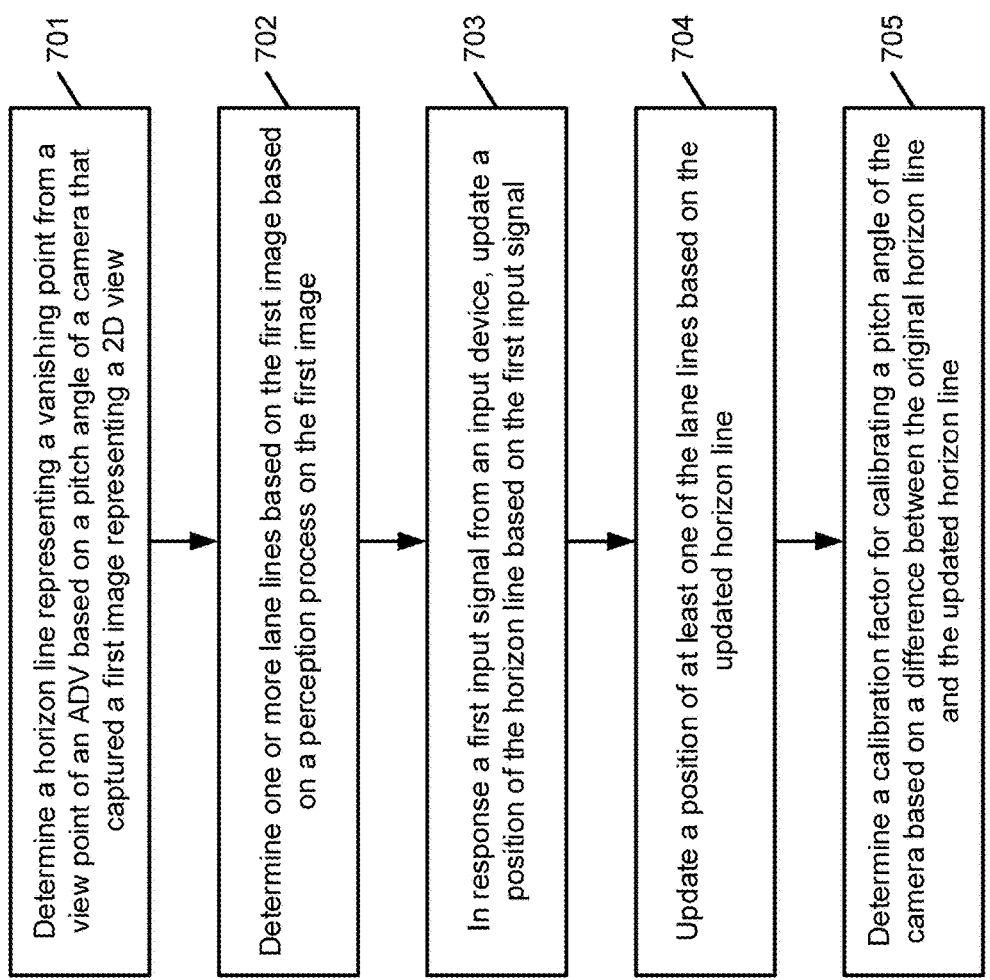
FIG. 7 is a flow diagram illustrating an example of a process for calibrating sensors of an autonomous driving vehicle according to one embodiment.

FIG. 7 is a flow diagram illustrating an example of a process for calibrating sensors according to one embodiment. Process 700 may be performed by processing logic which may include software, hardware, or a combination thereof. For example, process 700 may be performed by sensor calibration module 308 or sensor calibration system 125. Referring to FIG. 7, at block 701, processing logic determines a horizon line representing a vanishing point from a view point of the ADV based on a pitch angle of a camera that captured a first image. The first image represents a 2D view from the view point of the ADV. At block 702, processing logic determines one or more lane lines based on the first image based on a perception process on the first image. In response to a first input signal received from an input device, at block 703, the position of the horizon line is updated based on the first input signal. At block 704, a position of at least one of the lane lines is updated based on the updated horizon line. At block 705, processing logic determines a calibration factor or parameter for calibrating a pitch angle of the camera based on the difference between the initial horizon line and the updated horizon line.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for calibrating a sensor of an autonomous driving vehicle (ADV), the method comprising:
    determining a horizon line representing a vanishing point from a view point of the ADV based on a pitch angle of a camera that captured a first image representing a two-dimensional (2D) view from the viewpoint of the ADV;
    displaying, on a first display area of a display device, the horizon line superimposed on a location within the first image that is based on a setting of the camera;
    displaying, on a second display area of the display device, a second image that is a three-dimensional (3D) view based on the first image and 3D information obtained from one or more other sensors of the ADV;
    determining one or more lane lines based on the first image based on a perception process performed on the first image and projecting the one or more lane lines onto the second image;
    in response to a first input signal received from an input device,
        updating a position of the horizon line superimposed on the first image, based on the first input signal, and
        updating a position of at least one of the lane lines projected onto the second image, based on the updated position of the horizon line superimposed on the first image; and
    determining a first calibration factor for calibrating the pitch angle of the camera based on a difference between the horizon line and the updated horizon line in view of the one or more lane lines and the updated position of the at least one of the one or more lane lines.

2. The method of claim 1, further comprising:
    repeating the receiving of an input signal from an input device and the updating a position of the horizon line and updating the position of the least one of the one or more lane lines until the one or more lane lines projected onto the second image are substantially parallel.

3. The method of claim 1, wherein the 3D view of the second image comprises a top-down view based on the first image and the 3D information obtained from the one or more other sensors of the ADV.

4. The method of claim 3, further comprising:
    in response to a fifth signal received from the input device, generating a radio detection and ranging (RADAR) image in a top-down view based on RADAR sensor data obtained from a RADAR device of the ADV and the first image;
    displaying the RADAR image within the second display area of the display device; and
    determining a fifth calibration factor for calibrating the RADAR device.

5. The method of claim 1, further comprising:
    generating a third image based on the first image and the second image, the third image representing a reconstructed 2D view of the first image based on 3D information associated with the second image; and
    displaying the third image within a third display area of the display device.

6. The method of claim 5, wherein updating a position of at least one of the lane lines comprises updating the position of the at least one lane line superimposed on the third image displayed within the third display area.

7. The method of claim 1, further comprising:
    in response to a second input signal received from the input device, modifying a position of at least one of the lane lines based on the second input signal;
    updating the position of the at least one of the lane lines superimposed on the second image displayed within the second display area; and
    determining a second calibration factor for calibrating a yaw angle of the camera based on a modification of the position of the at least one of the lane lines.

8. The method of claim 5, wherein the first, second, and third images are concurrently displayed in the first, second, and third display areas of the display device.

9. The method of claim 1, further comprising:
    in response to a third input signal received from the input device, modifying a position of at least one of the lane lines based on the third input signal;
    updating the position of the at least one of the lane lines superimposed on the second image displayed within the second display area; and
    determining a third calibration factor for calibrating a roll angle of the camera based on a modification of the position of the at least one of the lane lines.

10. The method of claim 1, further comprising:
    in response to a fourth signal received from the input device, generating a light detection and ranging (LIDAR) point cloud image in a top-down view based on LIDAR data obtained from a LIDAR device of the ADV and the first image;
    displaying the LIDAR point cloud within the second display area of the display device; and
    determining a fourth calibration factor for calibrating the LIDAR device.

11. A non-transitory machine-readable medium having instructions stored therein, which when executed by a processor, cause the processor to perform operations for calibrating a sensor of an autonomous driving vehicle (ADV), the operations comprising:
    determining a horizon line representing a vanishing point from a view point of the ADV based on a pitch angle of a camera that captured a first image representing a two-dimensional (2D) view from the viewpoint of the ADV;
    displaying, on a first display area of a display device, the horizon line superimposed on a location within the first image that is based on a setting of the camera;
    displaying, on a second display area of the display device, a second image that is a three-dimensional (3D) view based on the first image and 3D information obtained from one or more other sensors of the ADV;

determining one or more lane lines based on the first image based on a perception process performed on the first image and projecting the one or more lane lines onto the second image;

in response to a first input signal received from an input device, updating a position of the horizon line superimposed on the first image, based on the first input signal, and updating a position of at least one of the lane lines projected onto the second image, based on the updated position of the horizon line superimposed on the first image; and determining a first calibration factor for calibrating the pitch angle of the camera based on a difference between the horizon line and the updated horizon line in view of the one or more lane lines and the updated position of the at least one of the one or more lane lines.

12. The machine-readable medium of claim 11, wherein the operations further comprise:

repeating the receiving of an input signal from an input device and the updating of the position of the horizon line and updating the position of the least one of the one or more lane lines until the one or more lane lines projected onto the second image are substantially parallel.

13. The machine-readable medium of claim 11, wherein the 3D view of the second image comprises a top-down view based on the first image and 3D information obtained from one or more other sensors of the ADV.

14. The machine-readable medium of claim 13, wherein the operations further comprise:

in response to a fifth signal received from the input device, generating a radio detection and ranging (RADAR) image in a top-down view based on RADAR sensor data obtained from a RADAR device of the ADV and the first image;

displaying the RADAR image within the second display area of the display device; and determining a fifth calibration factor for calibrating the RADAR device.

15. The machine-readable medium of claim 11, wherein the operations further comprise:

generating a third image based on the first image and the second image, the third image representing a reconstructed 2D view of the first image based on 3D information associated with the second image; and displaying the third image within a third display area of the display device.

16. The machine-readable medium of claim 15, wherein updating a position of at least one of the lane lines comprises updating the position of the at least one lane line superimposed on the third image displayed within the third display area.

17. The machine-readable medium of claim 11, wherein the operations further comprise:

in response to a second input signal received from the input device, modifying a position of at least one of the lane lines based on the second input signal;

updating the position of the at least one of the lane lines superimposed on the second image displayed within the second display area; and determining a second calibration factor for calibrating a yaw angle of the camera based on a modification of the position of the at least one of the lane lines.

18. The machine-readable medium of claim 11, wherein the operations further comprise:

in response to a third input signal received from the input device, modifying a position of at least one of the lane lines based on the third input signal;

updating the position of the at least one of the lane lines superimposed on the second image displayed within the second display area; and determining a third calibration factor for calibrating a roll angle of the camera based on a modification of the position of the at least one of the lane lines.

19. The machine-readable medium of claim 11, wherein the operations further comprise:

in response to a fourth signal received from the input device, generating a light detection and ranging (LIDAR) point cloud image in a top-down view based on LIDAR data obtained from a LIDAR device of the ADV and the first image;

displaying the LIDAR point cloud within the second display area of the display device; and determining a fourth calibration factor for calibrating the LIDAR device.

20. A data processing system, comprising:

a processor; and a memory coupled to the processor to store instructions, which when executed by the processor, cause the processor to perform operations for calibrating a sensor of an autonomous driving vehicle (ADV), the operations including determining a horizon line representing a vanishing point from a view point of the ADV based on a pitch angle of a camera that captured a first image representing a two-dimensional (2D) view from the viewpoint of the ADV, displaying, on a first display area of a display device, the horizon line superimposed on a location within the first image that is based on a setting of the camera, displaying, on a second display area of the display device, a second image that is a three-dimensional (3D) view based on the first image and 3D information obtained from one or more other sensors of the ADV, determining one or more lane lines based on the first image based on a perception process performed on the first image and projecting the one or more lane lines onto the second image, in response to a first input signal received from an input device, updating a position of the horizon line superimposed on the first image based on the first input signal, and updating a position of at least one of the lane lines projected onto the second image, based on the updated position of the horizon line superimposed on the first image, and determining a first calibration factor for calibrating the pitch angle of the camera based on a difference between the horizon line and the updated horizon line in view of the one or more lane lines and the updated position of the at least one of the one or more lane lines.

* * * * *